United States Patent [19]

Van Der Poel et al.

[11] Patent Number: 4,929,298

[45] Date of Patent: May 29, 1990

[54] TIRE BUILDING DRUM INCLUDING AN EXPANDABLE SEGMENTAL CYLINDER ASSEMBLY AND A VACUUM CHAMBER

[75] Inventors: Robert J. Van Der Poel, Cruchten; Armand Wantz, Bissen, both of Luxembourg

[73] Assignee: The Goodyear Tire & Rubber Company, Akron, Ohio

[21] Appl. No.: 193,808

[22] Filed: May 13, 1988

[51] Int. Cl.⁵ .............................. B29D 30/24
[52] U.S. Cl. .................... 156/414; 156/416; 156/420
[58] Field of Search ............... 156/414, 415, 417, 418, 156/419, 420

[56] References Cited

U.S. PATENT DOCUMENTS

| | | | |
|---|---|---|---|
| 2,682,924 | 7/1954 | Lomazzo et al. | 164/69 |
| 2,711,862 | 6/1955 | Herr | 242/72 |
| 3,160,546 | 12/1964 | Burton | 156/417 |
| 3,503,829 | 3/1970 | Menell et al. | 156/133 |
| 3,644,162 | 2/1972 | Appleby et al. | 156/415 |
| 3,654,026 | 4/1972 | Brinkley et al. | 156/420 |
| 3,837,968 | 9/1974 | Marra | 156/415 |
| 4,061,289 | 12/1977 | Miura et al. | 242/7.13 |
| 4,090,909 | 5/1978 | Christie et al. | 156/414 |
| 4,126,507 | 11/1978 | Kim et al. | 156/394 |
| 4,220,494 | 9/1980 | Kawaida et al. | 156/415 |
| 4,402,782 | 9/1983 | Klose et al. | 156/416 |
| 4,510,012 | 4/1985 | Kawaida et al. | 156/415 |
| 4,521,269 | 6/1985 | Ozawa | 156/420 |

FOREIGN PATENT DOCUMENTS

| | | | |
|---|---|---|---|
| 0137946 | 10/1980 | Japan | 156/420 |
| 1178734 | 1/1970 | United Kingdom . | |
| 1563342 | 3/1980 | United Kingdom . | |

Primary Examiner—Michael W. Ball
Assistant Examiner—Steven D. Maki
Attorney, Agent, or Firm—Frederick K. Lacher; T. P. Lewandowski

[57] ABSTRACT

A tire building drum (10) has a plurality of expandable axially extending, circumferentially spaced-apart segments (18) with an elastic cover sleeve (48). The radius (C) of the radially inner surface (50) of the cover sleeve (48) is greater than the radius (B) of the radially outer surface (20) of the segments (18) in the contracted condition of the drum (10) for placing the cover sleeve (48) over the segments (18) and is less than the radius (A) of the radially outer surface (20) of the segments (18) in the expanded condition of the drum (10) for gripping the segments (18) and maintaining a precise position of the cover sleeve (48). The segments have replaceable cover plates (38) of different thicknesses which are easily interchangeable to provide different drum components for different size tires. The ends of the drum (10) are sealed to provide a vacuum chamber (76) inside the drum (10) which is in communication with vacuum holes (78) in the cover sleeve (48) to hold the tire components on the drum surface (58) during assembly of the tire components.

10 Claims, 4 Drawing Sheets

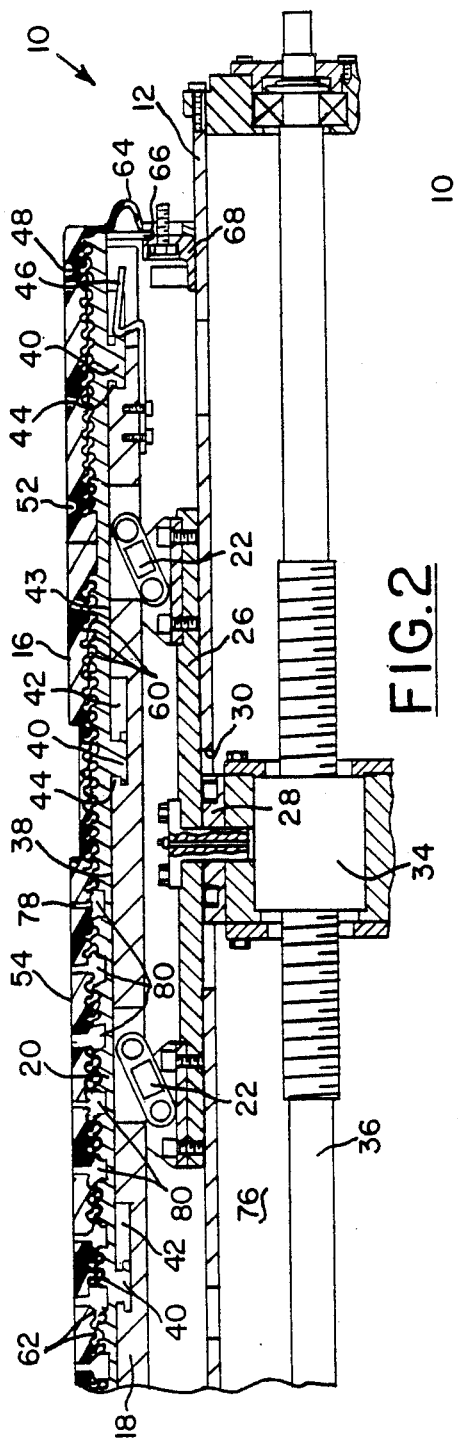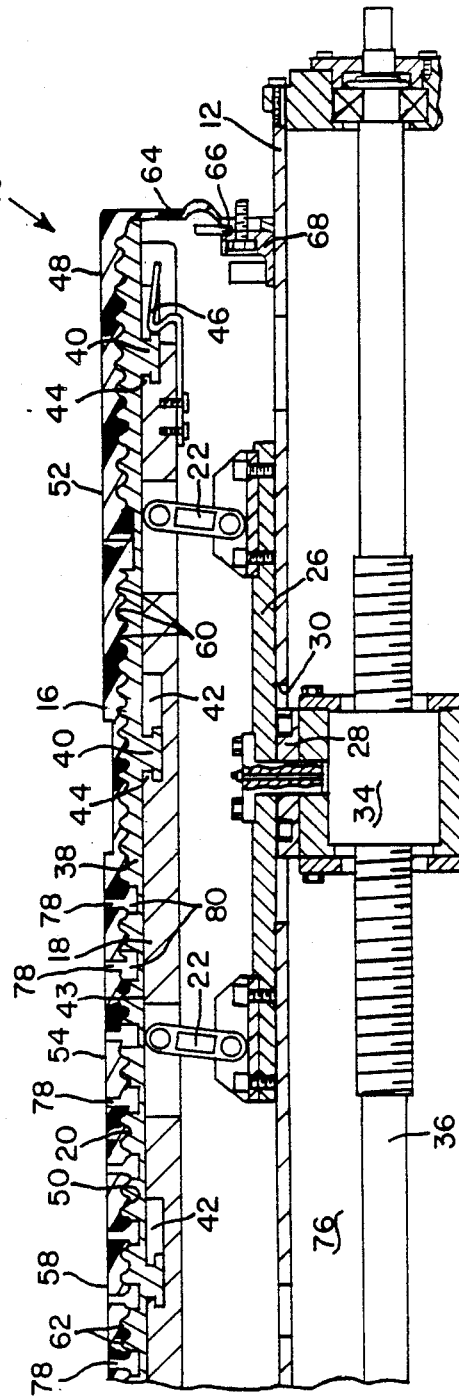

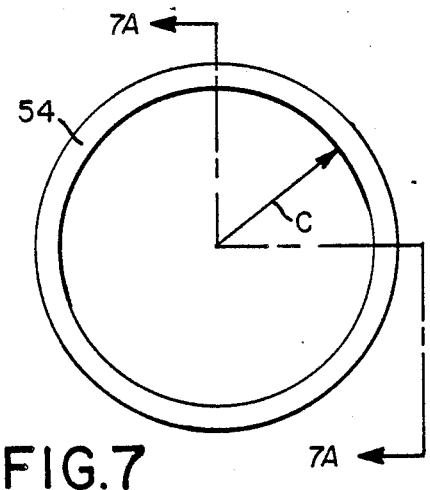 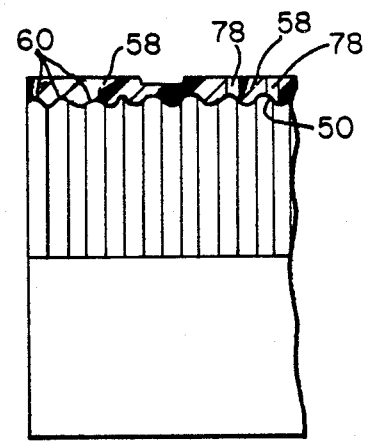
FIG.7   FIG.7A
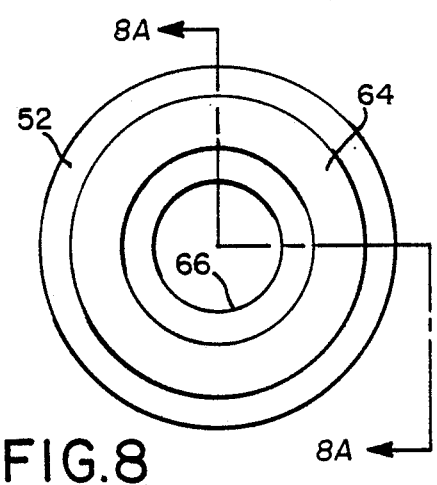 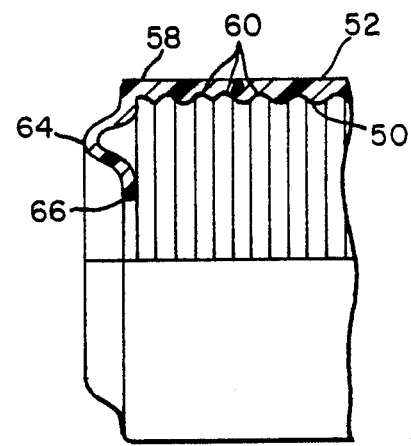
FIG.8   FIG.8A
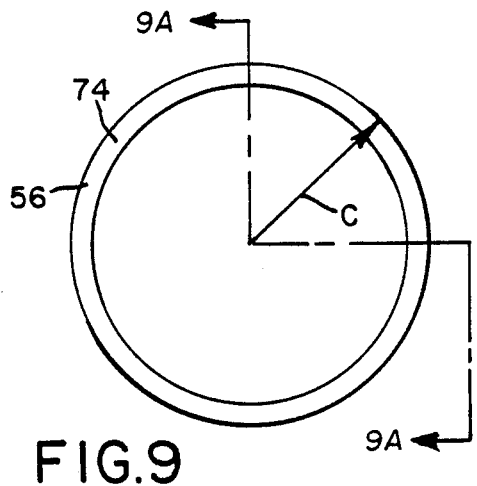 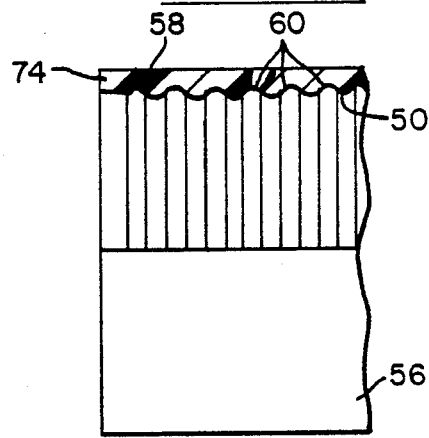
FIG.9   FIG.9A

TIRE BUILDING DRUM INCLUDING AN EXPANDABLE SEGMENTAL CYLINDER ASSEMBLY AND A VACUUM CHAMBER

This invention relates generally, as indicated, to a tire building drum and especially to a band building drum which can be quickly changed in size to provide a number of different diameter drum surfaces. In the manufacture of tires, it is desirable to use one drum to build tire components for different diameter tires. It is also desirable to provide a continuous smooth surface on which the components can be assembled.

Heretofore, a segmental drum with an elastic diaphragm has been proposed in which the diaphragm is stretched over the segments and has flanged edges for gripping the edges of the segments. The segments are expanded by the inflation of expandable air chambers and the desired diameter of the drum is provided by limiting the radially outward movement of the segments with fingers on abutment members at the ends of the drum. The fingers are adjustable for engaging the ends of the segments at different diameters. Although this drum can be expanded during the manufacture of a tire of one size, no provision has been made for quickly adjusting the expanded diameter of the drum to assemble tire components for different size tires.

The present invention is directed to a tire building drum which has radially movable segments with quick-change cover plates of different thicknesses for attaching to the segments. The elastic cover sleeve is slidable over the segments in the contracted condition of the drum and upon expansion of the segments, the cover sleeve is stretched to the desired radius for assembling the tire components.

In accordance with an aspect of this invention there is provided a tire building drum comprising a drum support shaft, an expandable segmental cylinder assembly mounted on the support shaft, the cylinder assembly having a plurality of axially extending, circumferentially spaced-apart segments, each of the segments being expandable from a first radius in a contracted condition of the drum to a second radius in an expanded condition of the drum, an elastic cover sleeve having a radially inner surface with a radius greater than the first radius and less than the second radius of the segments so that the cover sleeve is axially movable to a position over the cylinder assembly in the contracted condition of the drum and is stretched in the expanded condition of the drum for engagement with the cover sleeve in the expanded condition of the drum to maintain the precise axial position of the cover sleeve relative to the segments.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

In the annexed drawings:

FIG. 2 is a sectional view like FIG. 1 of the outboard portion of the tire building drum of FIG. 1 showing the drum in the contracted condition.

FIG. 2A is a sectional view like FIG. 2 showing the outboard portion of the drum in the expanded condition.

FIG. 7 is an end view of the center section of the cover sleeve.

FIG. 7A is a fragmentary sectional view taken along line 7A—7A in FIG. 7.

FIG. 8 is an end view of the outboard section of the cover sleeve.

FIG. 8A is a fragmentary sectional view taken along line 8A—8A in FIG. 8.

FIG. 9 is an end view of the inboard spacer section of the cover sleeve.

FIG. 9A is a fragmentary sectional view taken along line 9A—9A in FIG. 9.

Figure 1:
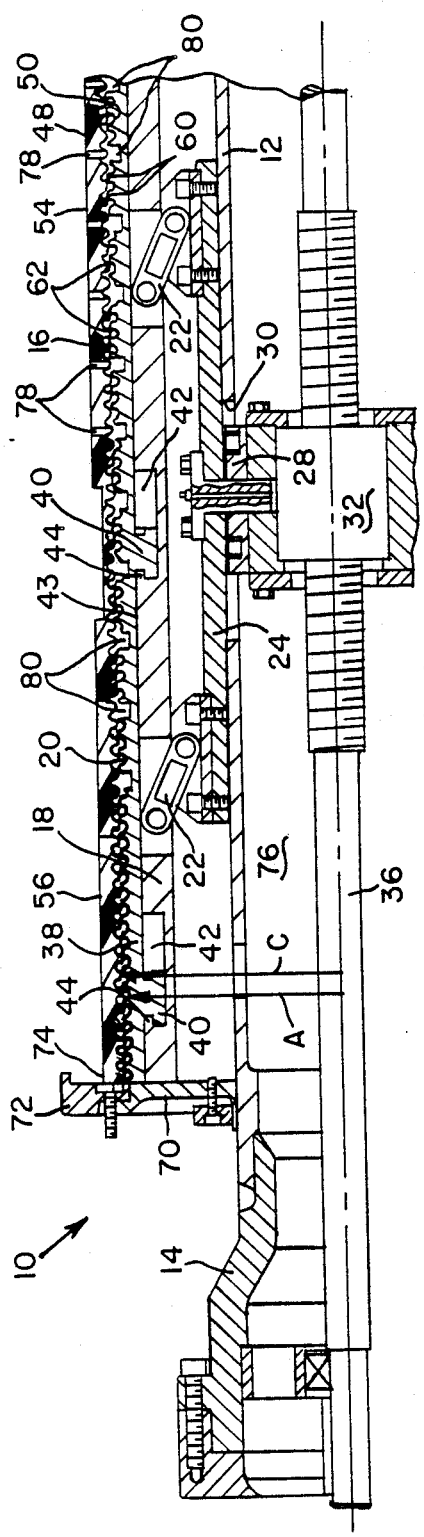
FIG. 1 is a fragmentary half sectional view of the inboard portion of a tire building drum embodying the invention with parts being broken away showing the drum in the contracted condition.
Figure 1A:
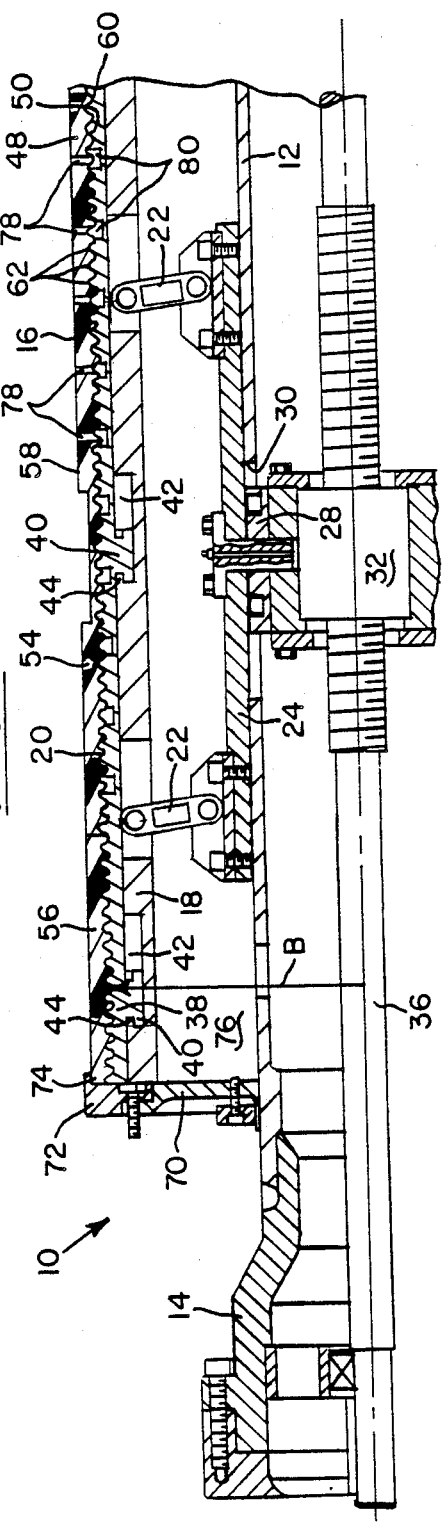
FIG. 1A is a sectional view like FIG. 1 showing the inboard portion of the drum in the expanded condition.
Figure 3:
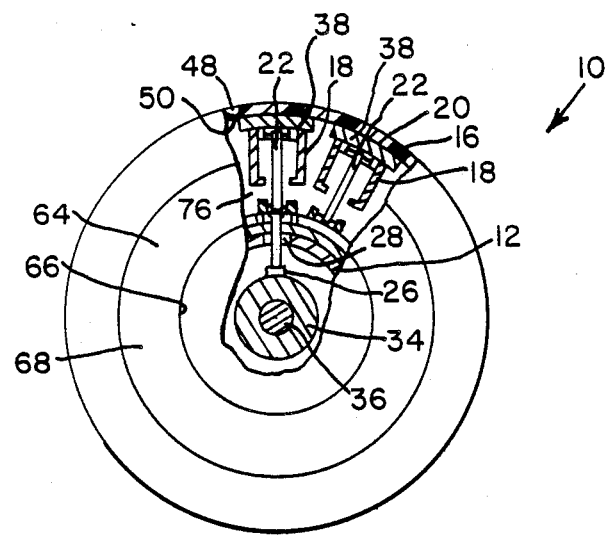
FIG. 3 is an end view of the outboard end of the drum with parts being broken away and sectioned to show the toggle linkage and carriage for moving the toggle links and causing the segments to expand and contract.
Figure 4:
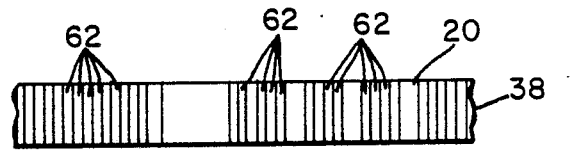
FIG. 4 is a top plan view of the radially outer surface of one of the replaceable cover plates embodying the invention.
Figure 5:
FIG. 5 is a bottom view of the radially inner surface of the cover plate of FIG. 4.
Figure 6:
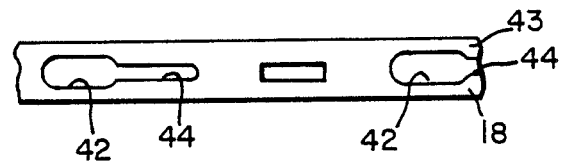
FIG. 6 is a top plan view of the radially outer surface of one of the segments embodying the invention.

Referring to FIGS. 1 through 3, a tire building drum 10 is shown having a drum support shaft 12 which may be mounted on a rotatable hub 14 connected to a shaft supported in a housing (not shown). A cylinder assembly 16 is mounted on the support shaft 12 and has a plurality of axially extending, circumferentially spaced-apart segments 18 positioned around the support shaft providing a generally cylindrical, radially outer surface 20. The segments 18 are expandable from a first radius A, shown in FIGS. 1 and 2, with the drum 10 in the contracted condition to a second radius B shown in FIGS. 1A and 2A with the drum in the expanded condition. Expansion and contraction of each of the segments 18 is provided by swinging movement of toggle links 22 pivotally connected to each of the segments and to an inboard carrier 24 and an outboard carrier 26 slidably mounted on the support shaft 12. The inboard carrier 24 and outboard carrier 26 are connected by spacers 28 extending through slots 30 in the support shaft 12 to nut members 32 and 34, respectively, A drive shaft 36 located within the support shaft 12 has threads of opposite hand in threaded engagement with the nut members 32 and 34 so that upon rotation of the drive shaft, the inboard carrier 24 and outboard carrier 26 will be moved in opposite directions. As shown in FIGS. 1 and 1A, the inboard carrier 24 is moved toward the inboard end of the drum to expand the drum from the contracted condition shown in FIG. 1 to the expanded condition shown in FIG. 1A. As shown in FIGS. 2 and 2A, the outboard carrier 26 is moved in an outboard direction to expand the drum 10 from the contracted condition shown in FIG. 2 to the expanded condition shown in FIG. 2A.

Each of the segments 18 has a replaceable segment cover plate 38 connected to the segments by flanged lugs 40 which are movable into keyholes 42 in a radially outer supporting surface 43 of each of the segments.

The keyholes 42 have flanges 44 which are engageable with the flanges of the lugs 40 upon axial movement of the cover plate 38 toward the inboard end of the drum as shown in FIGS. 1 and 2. A spring latch 46 may be mounted at the outboard end of each of the segments 18 for gripping the cover plate lugs 40 the outboard end of each of the segments.

An elastic cover sleeve 48 is positioned over the cylinder assembly 16 and has a radially inner surface 50 for engagement with the radially outer surface 20 of the segments 18. The elastic cover sleeve 48 may have an outboard sleeve section 52, a center sleeve section 54 and an inboard sleeve section 56 shown more clearly in FIGS. 7, 7A, 8, 8A, 9 and 9A. The elastic cover sleeve 48 is of a resilient material such as molded urethane having a thickness whereby in the expanded condition of the drum 10, the cover sleeve bridges the spaces between the segments 18 resisting deflection and providing a smooth drum surface 58 on which the tire components can be assembled. In this embodiment, the cover sleeve 48 has a thickness of 20.32 mm (0.8 inches).

As shown in FIGS. 1 and 2, the elastic cover sleeve 48 has a radius C at the radially inner surface 50 which is greater than the first radius A of the radially outer surface 20 of the segments 18 in the contracted condition of the drum 10 so that the inboard sleeve section 56, center sleeve section 54 and outboard sleeve section 52 of the elastic cover sleeve 48 can be placed over the radially outer surface of the segments 18 as shown in FIGS. 1 and 2. Then upon expansion of the segments 18 to the expanded condition of the drum 10 shown in FIGS. 1A and 2A, the second radius B of the segments 18 is greater than the radius C of the radially inner surface 50 of the cover sleeve 48 causing the elastic cover sleeve to stretch and firmly grip the segments 18 to maintain the precise axial position of the cover sleeve relative to the segments. In this embodiment, the first radius A of the segments 18 in the contracted condition of the drum 10 is 195 mm (7.65 inches). The radius of the segments 18 in the expanded condition of the drum is 225 mm (8.88 inches) and the radius C of the radially inner surface 50 of the cover sleeve 48 is 200 mm (7.88 inches).

The radially inner surface 50 of the cover sleeve 48 may have a plurality of axially spaced-apart, circumferentially extending cover sleeve grooves 60, shown more clearly in FIGS. 7A, 8A and 9A, for engagement with axially spaced, circumferentially extending ribs 62 on the radially outer surface 20 of the segments 18. Upon expansion of the segments 18 into the expanded condition of the drum 10, the ribs 62 will engage the groove 60 and further hold the cover sleeve 48 in a precise axial position on the segments. This engagement will also maintain the seal between the edges of the center sleeve section 54, the outboard sleeve section 52 and the inboard sleeve section 56.

In addition to the seals between the sleeve sections 50, 52 and 54, the outboard sleeve section 52 has a radially extending cover sheet member 64 with a radially inner edge 66 which may be gripped in sealing engagement with a ring 68 on the drum support shaft 12. At the inboard end of the drum 10, an inboard flange 70 is mounted on the support shaft 12 to enclose the inboard end of the cylinder assembly 16. A sealing ring 72 is mounted on the outer edge of the flange 70 and has a lip for engaging an inboard edge 74 on the inboard sleeve section 56 upon expansion of the segments 18 into the expanded condition of the drum 10 as shown in FIG. 1A. With this construction, a vacuum chamber 76 is provided within the cover sleeve 48 and the cylinder assembly 16 for communication to a suitable source of vacuum. Vacuum openings such as holes 78 are provided at predetermined positions on the drum surface 58 extending through the center sleeve section 54 to hold tire components on the drum surface. As shown in FIG. 7A and FIGS. 1, 1A, 2 and 2A, the holes 78 are positioned between two of the cover sleeve grooves 60 and over a vacuum groove 80 in the radially outer surface of the segments so that upon expansion of the segments 18 into engagement with the center sleeve section 54, the communication of vacuum to the holes 78 is maintained.

In operation, the tire building drum 10 is moved into the contracted condition shown in FIGS. 1 and 2 by rotating the drive shaft 36 and causing the inboard carrier 24 and outboard carrier 26 to move toward each other. The toggle links 22 are rotated radially inward to a position where the segments 18 have a radially outer surface 20 with the first radius A, which is less than the radius C of the radially inner surface 50 of the cover sleeve 48. By releasing the edge 66 of the cover sheet member 64 of the outboard sleeve section 52, the outboard sleeve section, center sleeve section 54 and inboard sleeve section 56 may be pulled off the segments 18 of the cylinder assembly 16. At this time, the cover plate 38 for each of the segments 18 may be pulled off the segments by depressing the spring latch 46 and then moving the cover plate axially to a position where the lugs 40 can be lifted out of the keyholes 42. The cover plate 38 may then be replaced with a replacement cover plate of a desired thickness by inserting the lugs of the replacement cover plate in the keyholes 42 and moving the replacement cover plate axially until the spring latch 46 snaps into place. When the outer diameter of the expanded drum 10 is being changed, the sealing ring 72 may be removed and a replacement sealing ring with a lip having the new diameter may be bolted in place. The inboard sleeve section 56 may then be slipped over the segments 18 followed by the center sleeve section 54 and the outboard sleeve section 52. The edge 66 of the cover sheet member 64 may then be clamped to the ring 68. The drive shaft 36 may then be rotated in a direction which will move the inboard carrier 24 away from the outboard carrier 26 and cause the toggle links 22 to rotate and expand the segment 18 into the expanded condition of the drum 10, shown in FIGS. 1A and 2A. The shoulder of the inboard edge 74 of the inboard sleeve section 56 will be pushed into sealing engagement with the lip of the sealing ring 72. The ribs 62 of the segments 18 will be pushed into the groove 60 of the elastic cover sleeve 48 clamping the inboard sleeve section 56, center sleeve section 54 and outboard sleeve section 52 in a precise position for receiving the tire components on the smooth drum surface 58. A vacuum may be applied to the drum surface 58 by communicating a vacuum source with vacuum chamber 76 within the drum 10 so that the tire component placed over the holes 78 in the center sleeve section 54 will be held against the drum surface 58. When all the tire components have been assembled on the drum 10, they may be removed by pulling them off the drum or, if desired, the drum may be contracted by a predetermined movement of the inboard carrier 24 toward the outboard carrier 26 during which time the elastic cover sleeve 48 will contract the segments 18 and maintain contact with the segments. If desired, an increased radius of the drum surface 58 may be obtained by using an elastic cover sleeve 48 of greater thickness. Other configurations of the groove 60 in the radially inner surface 50 of the cover sleeve 48 and of the ribs 62 in the segments 18 may be provided to prevent axial movement of the sleeve relative to the segments.

While a certain representative embodiment and details have been shown for the purpose of illustrating the invention, it will be apparent to those skilled in the art that various changes and modifications may be made therein without departing from the spirit or scope of the invention.

What is claimed is:

1. A tire building drum comprising a drum support shaft, an expandable segmental cylinder assembly mounted on said support shaft, said cylinder assembly having a plurality of axially extending, circumferentially spaced-apart segments, each of said segments being expandable from a first radius in a contracted condition of said drum to a second radius in an expanded condition of said drum, an elastic cover sleeve comprising an outboard sleeve section, a center sleeve section and an inboard sleeve section in abutting, sealing relation, sealing means at each end of said cover sleeve defining a vacuum chamber within said cover sleeve, said center sleeve section having vacuum openings at predetermined positions on a radially outer surface of said center sleeve for holding tire components on said radially outer surface, a source of vacuum in communication with said vacuum chamber within said cover sleeve, and said sealing means at said inboard end comprising a shoulder of an inboard edge of said inboard sleeve section engageable with a lip of an end flange mounted on said support shaft when the segmental cylinder assembly is expanded to said second radius.

2. A tire building drum in accordance with claim 1 wherein said sealing means at said outboard end of said cover sleeve comprises a radially extending cover sheet extending radially inward from an edge of said outboard sleeve section and a ring clamp on said support shaft in clamping engagement with said cover sheet.

3. A tire building drum in accordance with claim 1 wherein said cover sleeve is of a molded urethane having a thickness of about 20.32 mm (0.8 inch).

4. A tire building drum in accordance with claim 3 wherein said first radius of said segments in the contracted condition of said drum is 195 mm (7.65 inches), said second radius of said segments in said expanded condition of said drum is 225 mm (8.88 inches) and said cover sleeve has a radius of a radially inner surface of about 200 mm (7.88 inches).

5. A tire building drum in accordance with claim 1 wherein at least some of said segments have a plurality of axially spaced circumferentially extending grooves in a radially outer surface of said segments for communication with said vacuum openings.

6. A tire building drum in accordance with claim 5 wherein said cover sleeve has axially spaced-apart, circumferentially extending cover sleeve grooves in said inner surface for engagement with circumferentially extending ribs in said radially outer surface of said segments for preventing axial movement of said cover sleeve relative to said segments.

7. A tire building drum in accordance claim 6 wherein each of said segments has a replaceable segment cover plate with said segment grooves, said cover plate being mounted on the radially outer surface of each of said segments, said cover plate having spaced-apart lugs with flanges, and each of said segments having corresponding keyholes with flanges for positioning said lugs in said keyholes and means to move said segment cover plate axially relative to each of said segments to bring said flanges of said cover plate lugs into overlapping relation with said flanges of said keyholes in each of said segments.

8. A tire building drum in accordance with claim 7 wherein a spring lock means is positioned at the outboard end of each of said segments for locking said segment cover plate in position after mounting on each of said segments.

9. A tire building drum in accordance with claim 6 wherein each of said vacuum openings is positioned between two of said cover sleeve grooves in said inner surface of said cover sleeve and over a vacuum groove in said radially outer surface of at least one of said segments.

10. A tire building drum comprising a drum support shaft, an expandable segmental cylinder assembly mounted on said support shaft, said cylinder assembly having a plurality of axially extending, circumferentially spaced-apart segments, each of said segments being expandable from a first radius in a contracted condition of said drum to a second radius in an expanded condition of said drum, an elastic cover sleeve having a radially inner surface with a radius greater than said first radius and less than said second radius of said segments so that said cover sleeve is axially movable to a position over said cylinder assembly in said contracted condition of said drum and is stretched in said expanded condition of said drum for engagement with said segments in said expanded condition of said drum to maintain the precise axial position of said cover sleeve relative to said segments, said cover sleeve comprising an outboard sleeve section, a center sleeve section and an inboard sleeve section in abutting, sealing relation, sealing means at each end of said cover sleeve defining a vacuum chamber within said cover sleeve, said center sleeve section having vacuum openings at predetermined positions on a radially outer surface of said center sleeve for holding tire components on said radially outer surface, a source of vacuum in communication with said vacuum chamber within said cover sleeve, said sealing means comprising a shoulder of an inboard edge of said inboard sleeve section engageable with a lip of an end flange mounted on said support shaft when the segmental cylinder assembly is expanded to said second radius, said outboard sleeve section having a radially extending cover sheet extending radially inward from an edge of said outboard sleeve section and a ring clamp on said support shaft in clamping engagement with said cover sheet for sealing the outboard end of said vacuum chamber.

* * * * *